Dec. 4, 1934.  H. W. BUCKMAN  1,983,163
HIGH PRESSURE VALVE SEATING STRUCTURE
Filed April 2, 1932  2 Sheets-Sheet 1
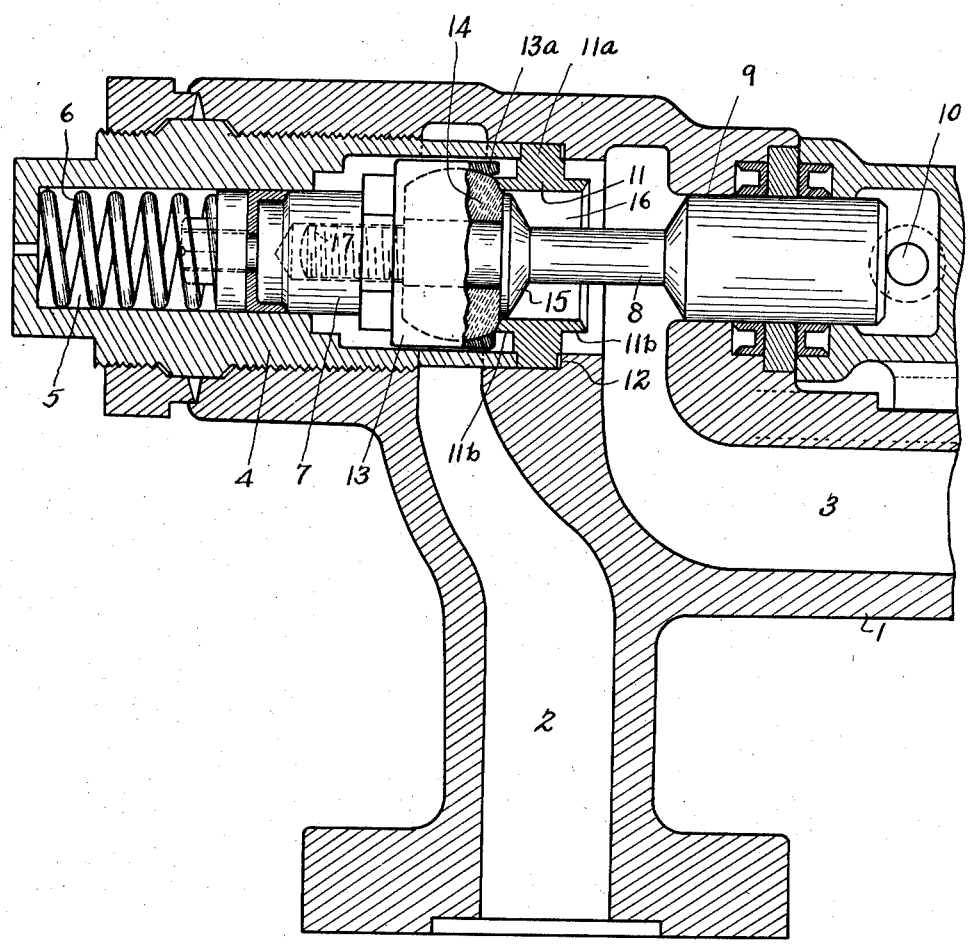
Fig. I
INVENTOR
Harold W. Buckman
by Christy Christy and Wharton
his attorneys Dec. 4, 1934.    H. W. BUCKMAN    1,983,163
HIGH PRESSURE VALVE SEATING STRUCTURE
Filed April 2, 1932    2 Sheets-Sheet 2
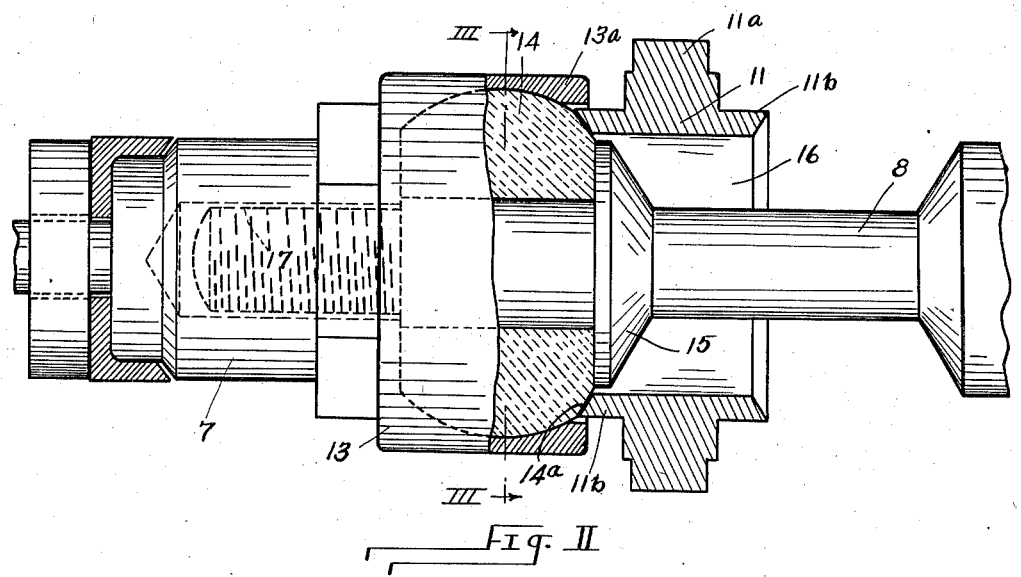
Fig. II
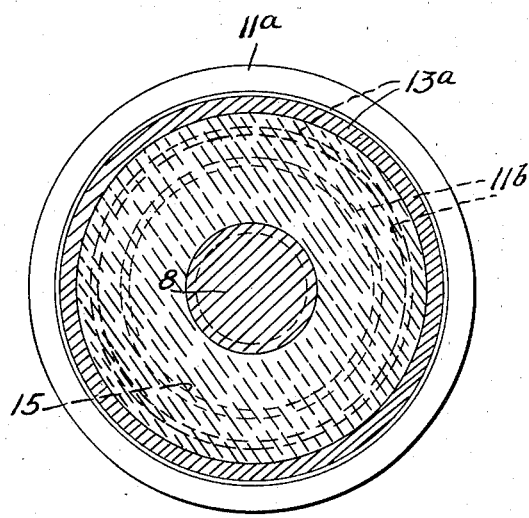
Fig. III
INVENTOR
Harold W. Buckman
by Christy Christy and Wharton
his attorneys Patented Dec. 4, 1934

1,983,163

UNITED STATES PATENT OFFICE 1,983,163

HIGH PRESSURE VALVE SEATING STRUCTURE

Harold W. Buckman, Pittsburgh, Pa., assignor to B. & D. Manufacturing Company, Inc., a corporation of Pennsylvania Application April 2, 1932, Serial No. 602,723

6 Claims. (Cl. 251—159)

This invention relates to a valve seating structure for high pressure fluid valves.

In valves designed for high fluid pressure, particularly in valves used in connection with hydraulic rams, and the like, it is of great importance that the valve seat and the seating element cooperating therewith be so formed and arranged as to produce a firm and adequate seal. In valves of this type the compressible seating element is further subjected to the scouring effect of liquid under high pressure, which rapidly destroys the utility of a seating element exposed to this scouring effect.

One object of my invention is to provide a valve seat and compressible seating element such that the seating element has a narrow contact with the valve seat, and is capable of material compression when seating and seated.

A further object of the invention is to so mount the compressible seating element that it is protected from the scouring effect of liquid under high pressure by simple and sturdy mounting means, and the seating element is also restrained from lateral, or radial, expansion when under compression.

A still further object of the invention is to provide a seating structure comprising a reversible seat, and a reversible seating element, thus increasing the life of the seating assembly.

In the accompanying drawings Figure I is a vertical sectional view through a high pressure fluid control valve embodying the seating structure of my invention; Figure II is a fragmentary sectional view of the valve stem and valve seat member, showing the mounting of a compressible seating element of the form shown in Figure I; and Figure III is a view taken in cross-section on the line III—III of Figure II.

With reference to Figure I of the drawings, the general valve structure comprises a body member 1 having an inlet passage 2 and an outlet passage 3. At one end of the valve body or casing 1 is a threaded end member or closure plug 4, which contains in its bore 5 a seating spring 6 and the element 7 of a two-piece valve stem. The other stem portion or element 8 is terminally formed to have a sliding fit in the bore 9 of the valve body or casing proper. Suitable valve operating means, indicated at 10, act upon the exterior face of this stem portion to unseat the valve against the resistance of seating spring 6.

In a valve of this general arrangement I insert an annular seat member 11. This seat member 11 comprises a mounting annulus 11a arranged to lie against a shoulder 12 in the valve casing 1 and to be locked in position by means of the threaded end member or closure plug 4 of the valve structure. Radially inward of its annular portion 11a the seat member is provided with flanges 11b, which extend oppositely from the annular body 11a, and are terminally provided with faces inclined inwardly of the seat structure toward the longitudinal axis thereof. Each of these annular faces provides an actual valve seat, and the seat member as a whole may be reversed in its position in the valve body or casing 1 to render either one of the faces effective.

Carried by, and desirably integral with, stem portion 7 is a socket member 13, the forward wall 13a of which lies outside the effectively presented flange 11b of the seat member 11, and desirably has a loose sliding fit therewith. The interior face of wall 13a is concave, so that it provides for the reception of a partially spherical seating element 14 of compressible material. On stem portion 8 there is a clamping member 15, desirably integral with the remainder of the stem, which is of slightly lesser cross sectional area than the cross sectional area of the bore 16 within seat member 11.

As will be seen by reference to Figures I and II of the drawings, stem portion 8 extends through a central opening in compressible seating element 14, and has a screw threaded engagement at 17 with the other stem portion 7. With globular seating element 14 in position in its socket, and with stem portion 8 screwed into stem portion 7, clamping member 15 compresses seating element 14 in its socket and firmly engages it therein. It will be seen by reference to Figure I that only a narrow annular region 14a of globular seating element 14 is exposed between the wall 13a of socket member 12 and the periphery of clamping plate 15. This annular exposed area of the seating element is merely sufficient to permit it to engage the oppositely positioned face flange 11b of the valve seat member 11. Upon movement of the valve stem to the left of Figure I into unseated position, seating element 14 is adequately protected from the scouring effect of the liquid under high pressure which is permitted to pass into the bore of the seat member.

The narrow annular contact region 14a of seating element 14 is fully protected from the scouring effect of fluid under high pressure by clamping plate 15, and by the annular wall 13a of socket 13; this wall 13a lying outwardly beyond clamping plate 15, and overlapping the seat flange in seated position of the parts. In seating, the seat flange, bearing against the narrow annular region on the deep and compressible seating element, compresses it highly in the region of contact, thus positively preventing leakage. The socket member 13 constrains the seating element in all regions save the narrow one contacted by the valve seat, thus preventing bulging of the seating element at any point. In a high pressure valve, bulging of the seating element would result in its rapid destruction, and it is of great importance that it be thus constrained.

It should be additionally noted that the preferred, part globular, form of seating element, shown in Figures I and II, is reversible in the socket member. It has thus a double life, in that an unworn annular region may, by reversal, be presented to the seat flange.

The fact that the seating element is protected from the scouring effect of the liquid under high pressure, and that it is of such form and positioning as to give great depth for compressibility, is of importance in high pressure valves used with hydraulic tools. The fact that frequent replacement of the seating element is avoided, prevents frequent shutting down of the machine with which the valve is used for the replacement of a seating element.

Attention has been called to the fact that the seating element contacts the valve seat in a narrow annular region, and that there is a relatively great depth of constrained compressible body backing up the region of contact. Not only does this structure prolong the life of the seating element, but it also cushions the seating shock present in hydraulic systems, and prevents shock in the machines to which the hydraulic systems are applied.

I claim as my invention:

1. In a valve seating structure for high pressure hydraulic control valves, the combination of a valve stem, a member providing an annular valve seat, a compressible seating element in part of substantially globular form perforate to surround the valve stem, a socket member on the valve stem for confining and supporting the seating element, said socket member having its interior surface curved to present to the valve stem a concave face concentric with the valve stem in conformity with the substantially part globular form of said seating element, thereby providing a matching surface for the substantially globular part of the seating element, a clamping member on said valve stem in opposition to said socket member and bearing against said seating element for compression of the seating element in its socket, said clamping member proportioned and positioned to leave exposed therearound an annular exposed area of the seating element defined by the socket member and the clamping member, said exposed annular area aligned for contact of the seating element with the annular valve seat.

2. The combination of claim 1 in which the substantially part globular seating element is of compressible rubber.

3. In a valve seating structure for high pressure hydraulic control valves the combination of a two-piece valve stem having telescoping regions on the two valve stem elements, means for inter-engaging the two elements of the valve stem in relatively adjusted positions, a compressible seating element in part of substantially globular form, said seating element perforate to embrace one element of the valve stem and so mounted on said element, a clamping flange on said stem element providing backing means for said seating element, and a socket member on said other stem element in opposition to said clamping flange whereby relative adjustment of the stem elements bringing the socket member and the clamping flange toward each other serves to compress the seating element in the socket member, said socket member having a concave face concentric with the axis of the valve stem in conformity with the substantially part globular form of the seating element.

4. The combination of claim 3 in which the substantially part globular seating element is of compressible rubber.

5. In a valve seating structure for high pressure hydraulic control valves the combination of a two-piece valve stem, the two valve stem elements being in longitudinal alignment with each other and relatively adjustable longitudinally of their axes, means for interengaging the two elements of the valve stem in relatively adjusted positions, a compressible seating element in part of substantially globular form, a socket member on one stem element for confining and supporting the seating element, said socket member having a concave face concentric with the axis of the valve stem in conformity with the substantially part globular form of the seating element, and a clamping member carried by the other stem element in opposition to the socket member whereby relative adjustment of the stem elements bringing the socket member and the clamping member toward each other serves to compress the seating element in the socket member.

6. The combination of claim 5 in which the substantially part globular seating element is of compressible rubber.

HAROLD W. BUCKMAN.